Jan. 1, 1924
O. N. SANDHOLM
HOSE CLAMP
Filed Jan. 22, 1923
1,479,679
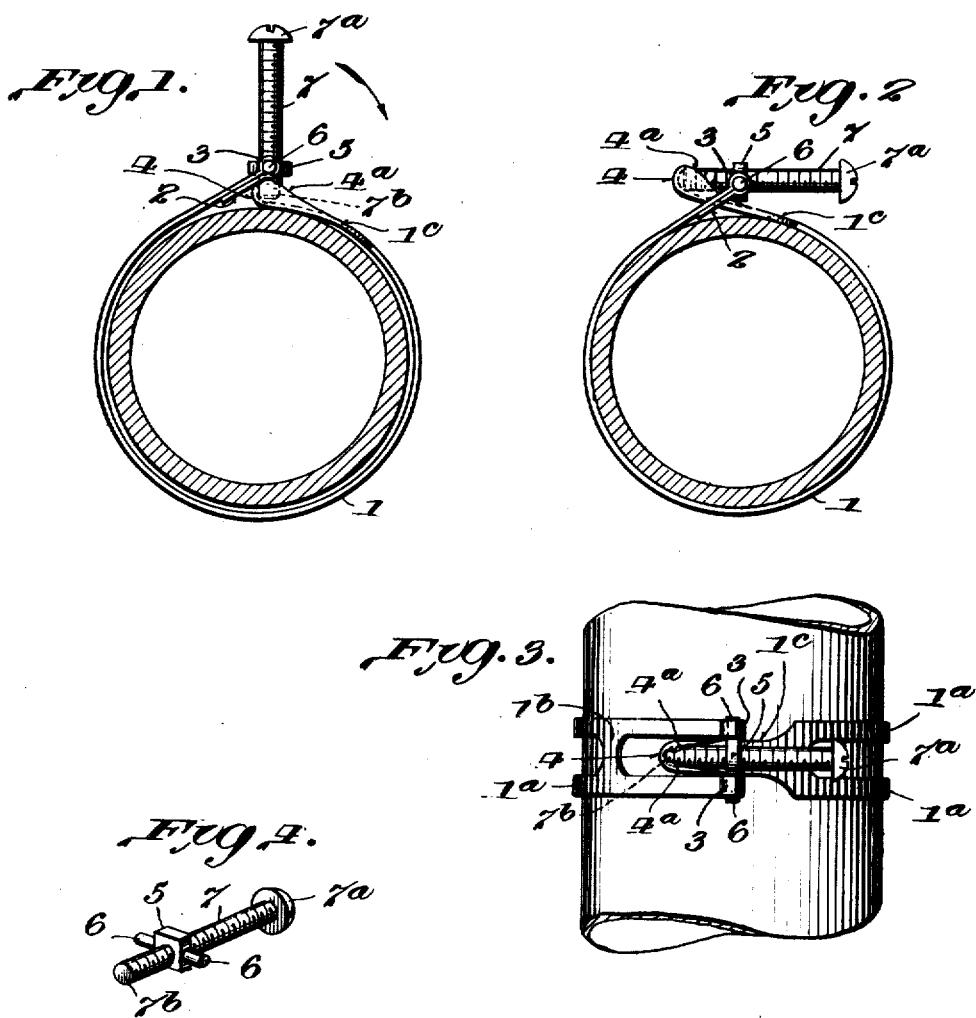

Patented Jan. 1, 1924.

1,479,679

UNITED STATES PATENT OFFICE.

OSCAR NELSON SANDHOLM, OF DENVER, COLORADO.

HOSE CLAMP.

Application filed January 22, 1923. Serial No. 614,279.

*To all whom it may concern:*

Be it known that I, OSCAR NELSON SANDHOLM, a citizen of the United States, residing at Denver, in the county of Denver and State of Colorado, have invented certain new and useful Improvements in Hose Clamps, of which the following is a specification.

This invention relates to adjustable clamping devices and pertains particularly to an improved hose clamp.

One object of the invention is to provide a hose clamp which may be quickly applied, clamped together, and fastened, and which may be operated by a single hand of the operator. This latter advantage renders the device capable of use in crowded quarters in which it may be nearly impossible for the operator to reach the hose with both hands.

For this purpose the invention provides a clamp in which the locking part effects a lever action to couple the opposite ends and initially take up most slack, and then completes a final tightening action by a screw threaded adjustment of the lever part.

The above and other advantages of this clamping device will be described and claimed in detail in the following specification and claims and illustrated in the accompanying drawing, in which:—

Fig. 1 is a side view of the clamp representing the position of the combined lever and fastening screw at the moment the ends of the clamp are initially fastened;

Fig. 2 illustrates the clamp after the initial slack has been taken up by the lever action of the combined lever and screw, and after the screw has been turned to further tighten the clamp;

Fig. 3 is a top view of the fastening portion of the clamp in a position illustrated in Fig. 2; and Fig. 4 is a perspective view of the threaded nut with the screw in position therein, illustrating the trunnions on the opposite sides of the nut.

Like parts are indicated by like reference characters in the different figures of the drawing.

The device will now be described in detail. In Figs. 1 and 2, the clamp is represented as a band passing around a hose section, and the band may be made of any suitable material, such as the metal commonly used for hose clamps. In Fig. 3, the band is shown as formed of two spaced strips 1ª from which the central portion has been struck out, thus rendering the material of the band flexible and light. A brace portion or cross strip is indicated at 1ᵇ between the two lengthwise strips 1ª. One end of the band is recurved and bent parallel and along the inner side of the band as indicated at 2, and the extreme end is spread to provide journals 3 with openings in alignment, as will be described. The opposite end of the band, indicated at 1ᶜ, is formed as a narrow strip sufficiently small to pass between the portions 1ª of the other end of the strip and between the journals 3. At the extreme end of the narrow portion 1ᶜ, a socket 4 is provided for the reception of the thrust engagement of the free end of the fastening screw, as will be described. The socket is illustrated as formed from the material of the end 1ᶜ, but having the extreme end curved upwardly and having side portions 4ª extending from the top of the bent up portion, downwardly and gradually to the band portion of the part 1ᶜ. The side portions 4ª with the curved up end portion form a scoop-shaped screw retaining end. This end may be struck up from one piece, or could be formed of sufficiently heavy block metal welded or otherwise united with the end portion 1ᶜ. The side walls 4ª assist in guiding the end of the fastening screw into the socket, and prevent the end of the screw from slipping out. The side walls 4ª also serve as braces to prevent the thrust action of the fastening screw from tending to bend the extreme end 4 backwardly and downwardly.

The fastening mechanism includes a threaded nut 5, which has on each of two opposite sides trunnions 6. The trunnions project into the journals 3 and the threaded nut 5 is fitted closely between the journals 3 and thus mounted for a pivotal movement with respect to that end of the band on which it is mounted. A fastening screw is shown as an ordinary stove bolt 7, having a slotted head 7ª and a threaded shank terminating in the usual end 7ᵇ. This bolt constitutes a combined lever and fastening member, and is threaded and normally fits in the nut 5.

The manner of fastening the clamp will now be explained. The opposite ends of the band 1 are brought into position around the object to be held and the socket end 4 is brought within reach of the end 7ᵇ of the screw 7, substantially as represented in Fig.

1, and the end of the screw is inserted into the socket. Next, the end 7ª of the screw is thrust downwardly toward the band and on the side of the trunnions opposite to the band end 2, that is, clockwise when considered with the figures of the drawings. This movement rocks the nut 5 and the trunnions with respect to the journals 3 and brings the socket end 4 partly toward the position shown in Fig. 2. During this movement, the socket end 4 is drawn inwardly between the spaced sides 1ª and beneath the nut 5. This lever action of the screw initially takes up most of the slack, and firmly positions the band and the clamp on the object to be held. A screw driver applied to the head 7ª may now be used for turning the screw 7 to further thrust the socket end 4 away from the nut 5.

It will be observed that the initial fastening and lever action of the device may be effected by the use of one hand of the operator, and that this device may be readily used in close places where there is relatively little room for the operator to use both hands to apply the clamp. The thrust action of the clamp serves to provide an equal pull on both ends of the clamp. It will be observed also that there is no right angle shoulder, or other angular shoulder near the ends, to dig into and squeeze the material of the hose or other article held, but on the contrary, the opposite ends of this clamp lay smoothly above the material. Further movement of the clamp, beyond that illustrated in Fig. 2, results in bringing the screw 7 and its cooperating parts increasingly closer to the main portion of the band and the article to be held, resulting in a further clamping action at that portion of the hose immediately adjacent the nut.

I claim:—

1. A fastening device comprising a band, spaced arms on one end of said band, a threaded nut having supporting arms on the opposite sides of said nut and journalled in said spaced arms, a screw bolt threaded in said nut and between said supporting arms, said band adjacent said spaced arms having a slot therein, and the end of said band opposite to said spaced arms being more narrow than the width of said slot and having a socket at the end thereof for the reception of the thrust end of said screw.

2. A fastening device comprising a band, spaced arms on one end of said band, a threaded nut having supporting arms on the opposite sides of said nut and journalled in said spaced arms, a screw bolt threaded in said nut and between said supporting arms, said band adjacent said spaced arms having a slot therein, and the end of said band opposite to said spaced arms being more narrow than the width of said slot and having a socket struck up from the material of the end of said band for the thrust reception of the end of said screw.

In testimony whereof I affix my signature.

OSCAR NELSON SANDHOLM.